US010081120B2

(12) United States Patent
Blondelet et al.

(10) Patent No.: US 10,081,120 B2
(45) Date of Patent: Sep. 25, 2018

(54) MACHINE AND METHOD FOR REMOVING BEADS FROM TIRES AT THE END OF LIFE

(71) Applicants: COMPAGNIE GENERALE DES ESTABLISSEMENTS MICHELIN, Clermont-Ferrand (FR); MICHELIN RECHERCHE ET TECHNIQUE, S.A., Granges-Paccot (CH)

(72) Inventors: Michel Blondelet, Clermont-ferrand (FR); Alberto Mattarozzi, Clermont-ferrand (FR); Andre Pallotta, Clermont-ferrand (FR); Patrick Rene, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 468 days.

(21) Appl. No.: 14/443,725

(22) PCT Filed: Nov. 19, 2013

(86) PCT No.: PCT/EP2013/074195

§ 371 (c)(1),
(2) Date: May 19, 2015

(87) PCT Pub. No.: WO2014/076308

PCT Pub. Date: May 22, 2014

(65) Prior Publication Data

US 2015/0290841 A1 Oct. 15, 2015

(30) Foreign Application Priority Data

Nov. 19, 2012 (FR) ..................................... 12 60954

(51) Int. Cl.
*B26D 3/00* (2006.01)
*B29B 17/02* (2006.01)
(Continued)

(52) U.S. Cl.
CPC .......... *B29B 17/0206* (2013.01); *B26D 3/005* (2013.01); *B29B 17/02* (2013.01);
(Continued)

(58) Field of Classification Search
CPC ................ B29B 17/0206; B29B 17/02; B29B 2017/022; C22B 1/00; B26D 3/005; Y02W 30/622; B29L 2030/001; B29L 2030/00
See application file for complete search history.

(56) References Cited

U.S. PATENT DOCUMENTS 3,838,492 A 1/1974 Uemura
4,873,759 A * 10/1989 Burch .................... B26D 3/005
241/DIG. 31

(Continued)

FOREIGN PATENT DOCUMENTS

| | | |
|---|---|---|
| FR | 2201182 | 4/1974 |
| JP | 2007185955 | 7/1974 |
| JP | 2003220610 | 8/2003 |

OTHER PUBLICATIONS

International Search Report for PCT/EP2013/074195 dated Apr. 7, 2014.

*Primary Examiner* — Richard Chang
(74) *Attorney, Agent, or Firm* — Dickinson Wright, PLLC

(57) ABSTRACT

Machine for extracting a cord made of metal material from a sidewall of a tire, being part of the sidewall and defining a support structure of said tire, including: a frame; support means for the tire configured to support said tire resting on one sidewall in a loading zone; a hook for extracting said cord from the sidewall of the tire; means for manipulating said hook, configured to manipulate the hook with respect to the frame in an extraction direction between a position for engagement with said tire in the loading zone and a position for disengagement from said tire and extraction of said cord; a command and control unit to command said means for manipulating the hook,:

(Continued)

an element able to move with respect to the frame to detach the cord from the hook when the hook is in position for disengagement;

and means for manipulating the movable element, to manipulate the movable element from a first position to a second position to carry out releasing of the cord from the hook.

22 Claims, 16 Drawing Sheets

(51) Int. Cl.
*C22B 1/00* (2006.01)
*B29L 30/00* (2006.01)

(52) U.S. Cl.
CPC .......... *C22B 1/00* (2013.01); *B29B 2017/022* (2013.01); *B29L 2030/00* (2013.01); *B29L 2030/001* (2013.01); *Y02W 30/622* (2015.05)

(56) References Cited

U.S. PATENT DOCUMENTS

| | | | | |
|---|---|---|---|---|
| 5,783,035 | A * | 7/1998 | Pederson ................ | B29B 17/02<br>156/714 |
| 6,249,949 | B1 * | 6/2001 | Cross, Jr. ............... | B26D 3/005<br>29/403.3 |
| 2002/0088557 | A1 | 7/2002 | Agostinelli | |

* cited by examiner

P5
D2
18
30
32
2c
2
34
32
41
2b
P1
23,20
6
61
32
34
62
2a
36
22
4,19
26,5,27
26,5,28
D1
15
9,10
16
42
43
3
P3
P8
24
7,44,45b
3
1

P5
18
D2
30
2c
2
23,20
2b
290
2a
22
4,19
32
6
16
15
P2
61
62
3
P8
7,44,45b
1
3

1
7,44,45b
32
7,44,45a
42
9,10
11,12
6
P3
43
3

1
18,18b
3
22
19
29
29c
4
29a
6
290
29b
18,18a 2b
2
18
2c
18
P5
P6
37
35
38
36
33
3

55b
55a
9,54
3
45
51
W1
1
P3
S2
46
6
32
P2
44b
44a
61
D3
D1

55b
55a
44b
44a
3
45
51
1
6
32
P2
62
9,54
P4

MACHINE AND METHOD FOR REMOVING BEADS FROM TIRES AT THE END OF LIFE

This application is a 371 national phase entry of PCT/EP2013/074195, filed 19 Nov. 2013, which claims benefit of French Patent Application No. 1260954, filed 19 Nov. 2012, the entire contents of which is incorporated by reference herein for all purposes.

BACKGROUND

1. Field

The present disclosure relates to a machine and a method for debeading tires, in particular heavy duty tires, at the end of life. The machine and method are used in the technical sector of recycling tires at the end of life.

2. Description of Related Art

The term "heavy duty tires" should be understood as meaning tires having a particularly large diameter, such as 57" and 63" tires, for example (these dimensions relating to the inside diameter of the rim). These tires are generally employed in earth-moving machines used in the mining sector. As is known, these tires are provided with a pair of annular steel cords that are associated with one and the other of the sidewalls of the tire and define as a whole a structure for supporting and stiffening the tire itself.

The expression "debeading" is understood as meaning the extraction of the steel cord from a sidewall of the tire itself.

In the field of tires, debeading machines that are configured to separate the steel cord from the tire are known. In summary, these machines make it possible to separate the steel cord from the rubber part of a tire such that, advantageously, the steel and rubber can be disposed of separately.

A machine of the known type comprises a frame, an inclined front plate for supporting a tire during treatment and a hook for extracting the small steel cord.

The extraction hook is able to move in an extraction direction between a position for coupling to the sidewall of the tire, in which it protrudes from the front plate in order to be coupled to the heel of the sidewall, and a position for disconnection and extraction of the cord, in which it is spaced apart from the central plate. In this position for disconnection and extraction, the operator manually removes the cord from the hook in order to dispose of the steel cord separately.

In the case of tires having a high weight, this operation can be dangerous for the operator and in any case tiring on account of the dimensions of the cord.

A requirement that is desired, in particular in the field of heavy duty tires, is that of being able to have a debeading machine that is particularly safe for the operator and which at the same time is simple and does not tire the operator during extended use thereof.

SUMMARY

The aim of embodiments of the present invention is thus to alleviate these drawbacks by developing a debeading machine and a debeading method that meet the requirement set out above.

One objective of an embodiment of the present invention is to make available a debeading machine which is particularly safe for the operator.

In accordance with an embodiment of the invention, this aim is achieved by a machine for extracting a cord made of metal material from a sidewall of a tire, said cord being part of the sidewall and defining a support structure of said tire, said machine comprising:

a frame;

support means for the tire which are configured to support said tire resting on one sidewall and disposed in a loading zone;

a hook for extracting said cord from the sidewall of the tire;

means for manipulating said hook, said means being configured to make it possible to manipulate the hook with respect to the frame in an extraction direction between a position for engagement with said tire, in the loading zone, and a position for disengagement from said tire and extraction of said cord, in a zone for receiving the cord;

said machine being characterized in that it comprises, in combination:

an element that is able to move with respect to the frame in order to detach the cord from the hook when the hook is in said position for disengagement;

and means for manipulating the movable element, said means being configured to manipulate the movable element from a first position to a second position in order to carry out said detachment of the cord from the hook.

This objective is also achieved by a method for extracting a cord made of metal material from the sidewall of a tire, said cord defining the support structure of the tire, said method comprising the steps of:

disposing said sidewall of the tire in a manner resting against support means in a pre-established position;

prearranging a hook for extracting the cord;

disposing the hook in a position for engagement with the sidewall of said tire and gripping the internal surface of said sidewall;

moving the hook in an extraction direction from the position for engagement to a position for disengagement and extraction of the cord from the sidewall, the method being characterized in that it comprises the steps of:

prearranging a movable element for removing the cord from the hook;

moving said movable element, when the hook is in said position for disengagement and extraction, from a rest position to an operating position in order to come into contact with the cord coupled to said hook and to remove the cord from the hook.

Another objective of an embodiment of the invention is to make available a debeading machine which is able to effectively and reliably pull the metal heel reinforcement cord from a precut sidewall (or a sidewall separated from the tread) of the tire.

In accordance with an embodiment of the invention, this aim is achieved by a machine for extracting a cord made of metal material from a sidewall of a tire, said cord being part of the sidewall and defining a support structure of said tire, said machine comprising:

a frame;

support means for a tire sidewall;

a hook for extracting said cord from the sidewall of the tire;

means for manipulating said hook, said means being configured to make it possible to manipulate the hook with respect to the frame in an extraction direction between a position for engagement with said tire sidewall and a position for disengagement from said tire sidewall and extraction of said cord;

said machine being characterized in that it comprises means for clamping a tire sidewall against a supporting plate of said support means and in that said clamping means comprise one or more clamping elements that are able to move between a releasing position and a clamping position in which they act on the surface of said sidewall in order to clamp it against the plate.

Thus, the metal heel reinforcement cord is extracted effectively from a tire sidewall which has previously been separated from the cap of the tire by clamping it against a supporting plate while the cord is being pulled out with the aid of an extraction hook. The sidewall is held firmly against the supporting plate during the movement of the extraction hook between a position for engagement with the sidewall of the tire and a position for disengagement and extraction of the cord. This is particularly advantageous in the case of heavy duty tires for which the debeading operation proves to be very difficult on account of the high pulling forces that build up at the hook.

This aim is also achieved by a method for extracting a cord made of metal material from the sidewall of a tire, said cord defining the support structure of the tire, said method comprising the steps of:

separating said sidewall from the cap of the tire;

disposing said sidewall of the tire in a manner resting against support means in a pre-established position;

prearranging a hook for extracting the cord;

disposing the hook in a position for engagement with the sidewall of said tire and gripping the internal surface of said sidewall;

moving the hook in an extraction direction from the position for engagement to a position for disengagement and extraction of the cord from the sidewall, the method being characterized in that it comprises the following steps:

a step of clamping the sidewall against a supporting plate of said support means prior to the hook being moved from the position for engagement to the position for disengagement and extraction of the cord, and a step of releasing the sidewall following extraction of the cord by the hook.

Further technical features of embodiments of the invention are the subject of the secondary claims.

BRIEF DESCRIPTION OF DRAWINGS

According to the abovementioned objectives, the technical features of the embodiments of the invention are clearly verifiable from the content of the claims mentioned below and the advantages thereof will become even more apparent from the following detailed description which is given with reference to the attached drawings, which show an embodiment that serves purely as an example and is not limiting, and in which:

DETAILED DESCRIPTION OF SPECIFIC EMBODIMENTS

Figure 1:
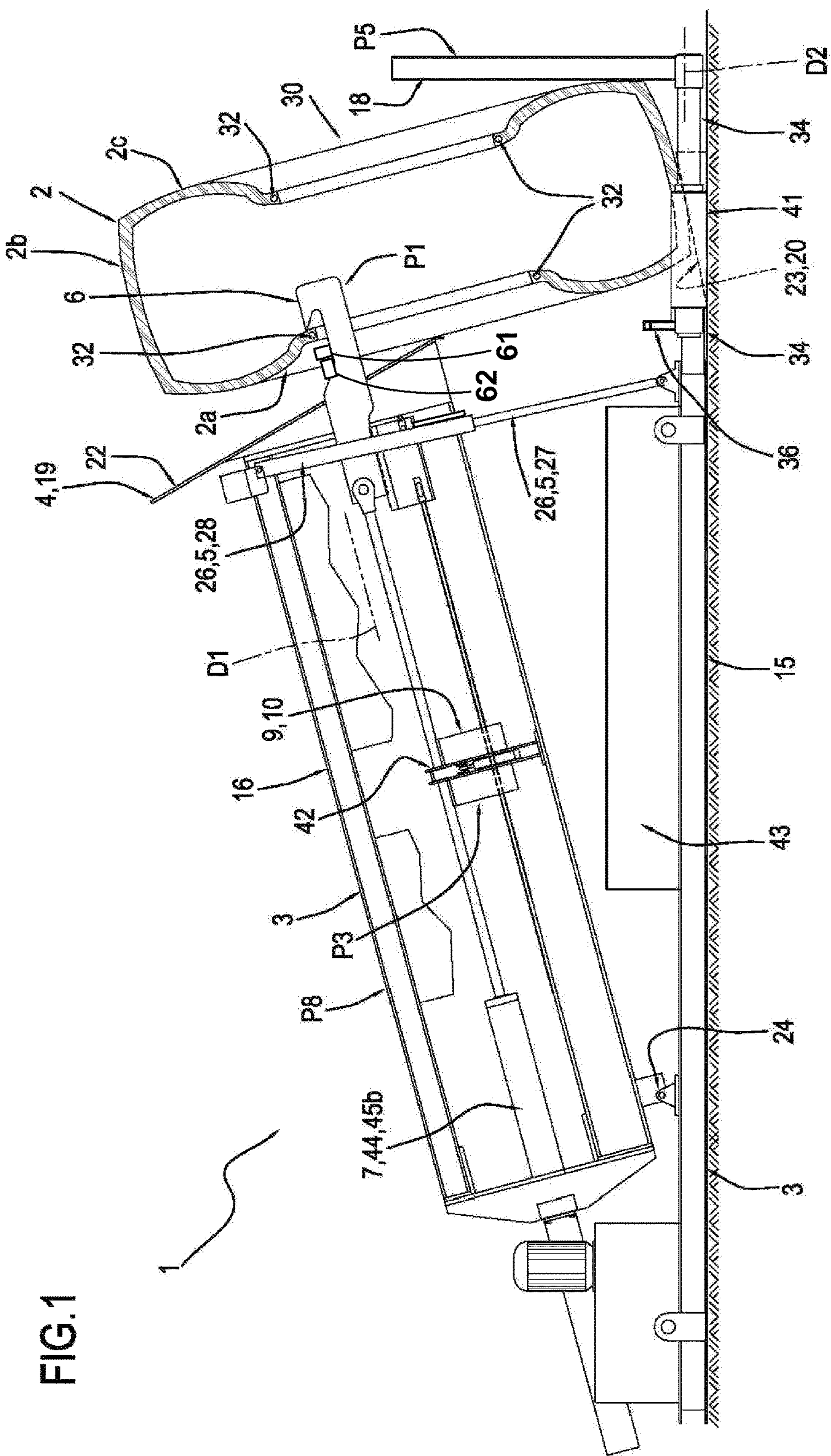
FIGS. 1 to 3 illustrate side views of a machine that is the subject of an embodiment of the present invention, corresponding respectively to different operating configurations.

In accordance with the attached drawings, a piece of equipment for debeading heavy duty tires 2 at the end of life is designated 1.

The expression "debeading" is understood as meaning extracting the steel cord (or bead wire) which constitutes the supporting structure for the beads of the tire.

It should be noted that this machine 1, which will be described below, is configured for carrying out the operation of debeading tires commonly referred to as heavy duty tires, that is to say tires having large dimensions.

In particular, this machine 1 is capable of debeading tires 2 having a diameter of up to sixty-three inches (this dimension referring to the inside diameter of the rim).

However, it should be noted that the machine 1 is capable of debeading even tires having smaller dimensions, preferably a diameter of up to thirty-three inches (this dimension referring to the inside diameter of the rim).

According to the invention, the machine 1 comprises a frame 3. This frame 3 comprises a plurality of beams/elements which are connected together in order to define a rigid support structure.

Moreover, the machine 1 comprises support means 4 for the tire 2 which are configured to support the tire 2 in a manner resting on one sidewall 2*a* in a pre-established position within a loading zone 30.

The machine 1 can debead a tire 2 or else, in a more advantageous manner and as will be described in more detail below, a part of the tire 2 that is formed by a sidewall 2*a* of said tire 2; in the latter case, provision is made for the sidewall 2*a* to be separated from the cap 2*b* and for only the sidewall 2*a* (without the cap 2*b*) to be disposed on the machine 1.

Preferably, the support means 4 for the tire comprise a plate 22 disposed in the loading zone 30. This plate 22 has a supporting surface 19 for the sidewall 2*a* of the tire 2. During use, this surface 19 is disposed in a substantially inclined manner with respect to a vertical plane.

Preferably, the first supporting surface 19 is carried by a plate 22 comprising an opening 29 for the hook 6 and the steel cord 32 to pass through during the extraction of said cord 32, said opening 29 comprising an upper vertical part (29*a*) and a lower vertical part 29*c*, and a horizontal part 29*b*. The plate 22 supports a shutter 290 that is able to move vertically and is intended to shut off the lower vertical opening 29*c* and makes it possible to avoid jamming of the bead wire during extraction.

Preferably, the support means 4 can be configured such that, during debeading, the tire 2 is inclined with respect to a vertical plane, such that the cap 2*b* partially rests on the ground or on an element 23 located beneath.

Preferably, according to a variant, the support means 4 also comprise an element 23 having a lower support surface with a surface 20 for supporting the cap 2*b*.

Preferably, the surface 20 of the lower support element 23 is inclined with respect to a vertical plane in the opposite direction compared with the surface 19; in this way, the tire 2 is advantageously supported in a particularly stable and secure manner in the loading zone 30. The lower support element 23 can advantageously cooperate with the plate 22 in order to ensure a correct position of the tire 2.

Figure 3:
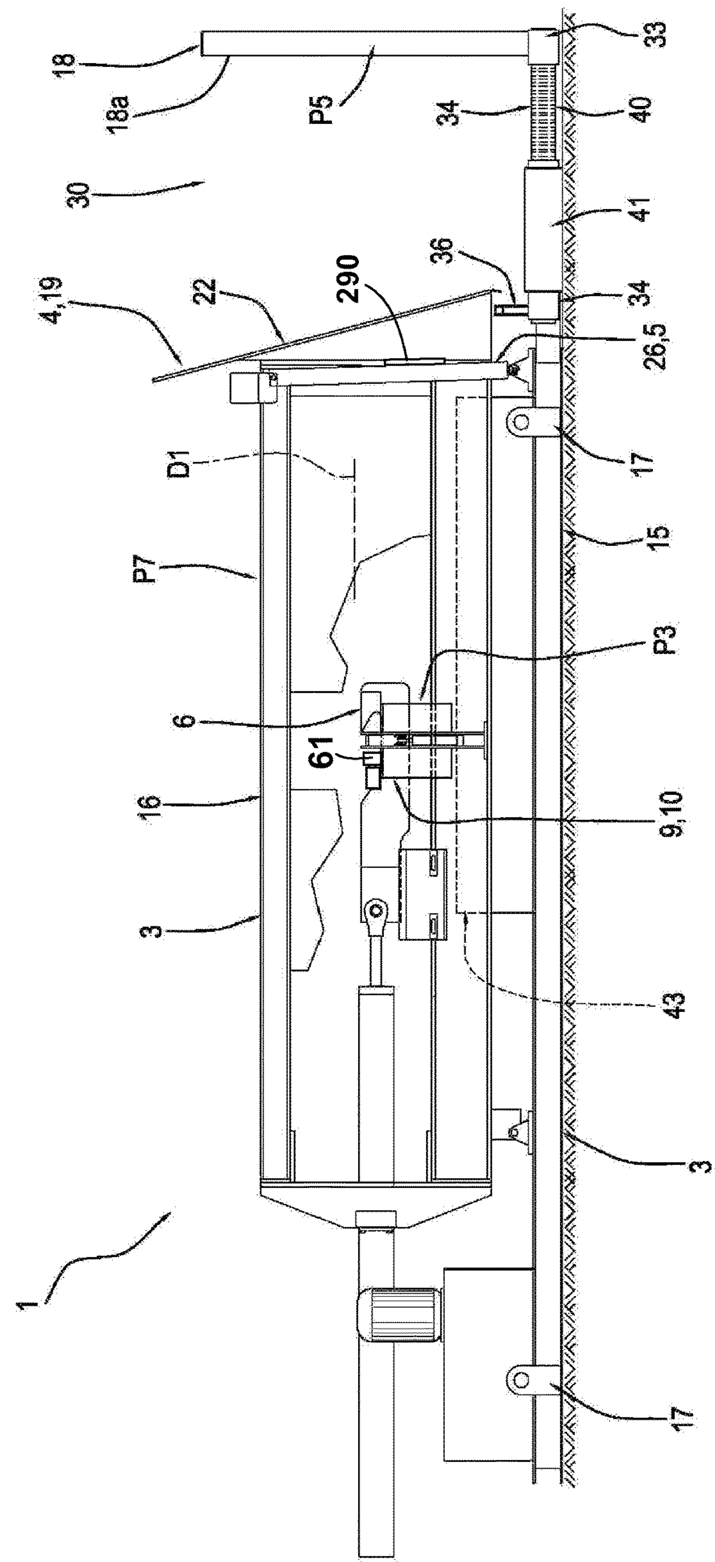
Figure 4:
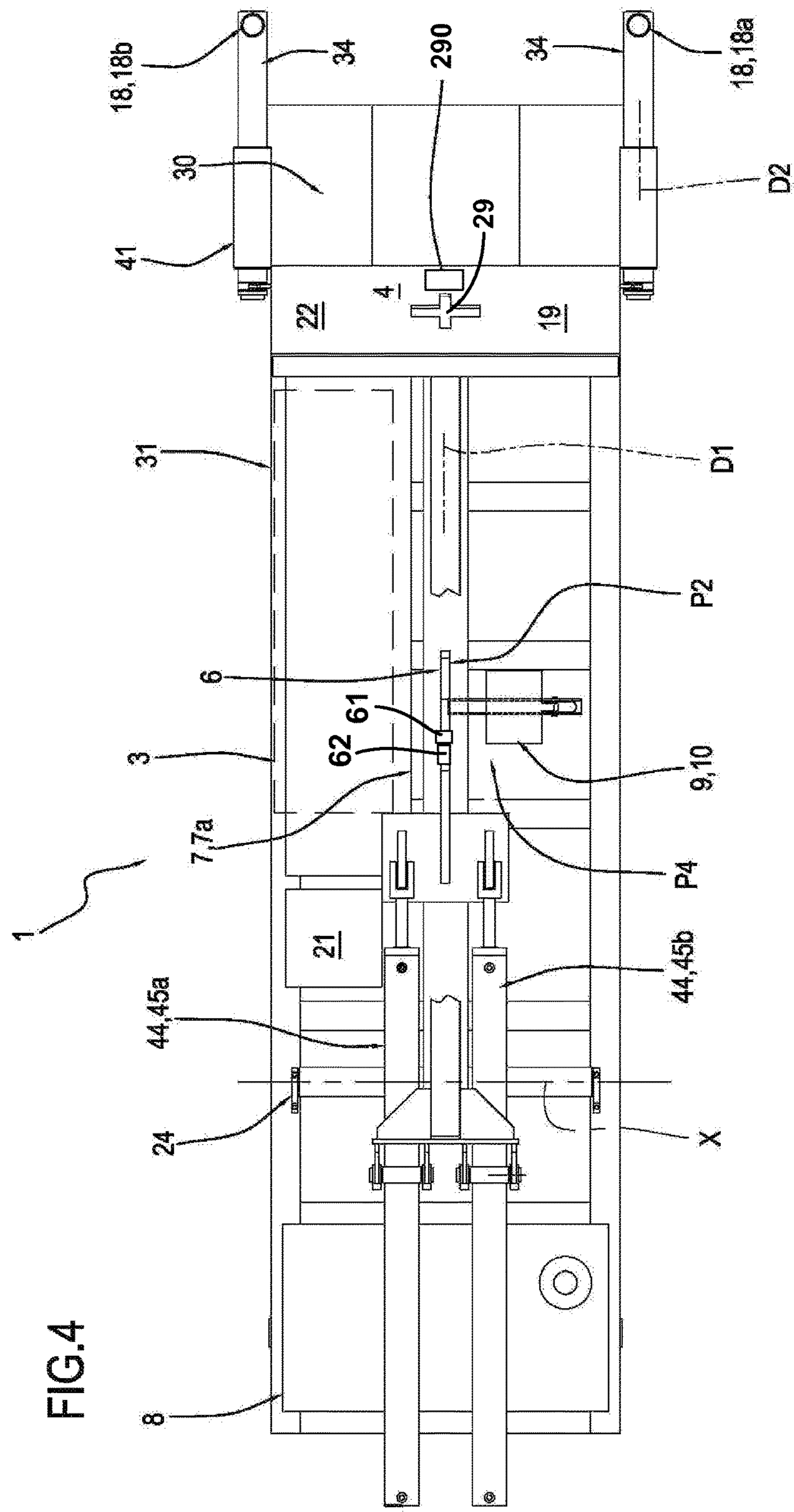
FIG. 4 illustrates a schematic plan view of a machine that is the subject of an embodiment of the present invention.

Moreover, as shown in the appended figures, the machine 1 comprises means 18 for holding the tire 2 in the pre-established position, said means being disposed in the abovementioned loading zone 30. These retaining means 18 (clearly visible in FIGS. 3, 8 and 9) are able to move between a first operating position P5, in which they do not cooperate with the support means 4 for holding said tire 2 in the pre-established position, and a second, rest position P6 in which they cooperate with the support means 4 for holding said tire 2 in the pre-established position. The retaining means 18 are rotationally connected to the frame 3 so as to be driven in rotation between said first and second positions (P5, P6).

The retaining means 18 comprise a pair of longitudinal elements (18*a*, 18*b*) that are connected to the frame 3 and located opposite the support means 4 for the tire 2. In particular, the longitudinal elements (18*a*, 18*b*) are placed facing the plate 22, in the loading zone 30 for the tire.

Each longitudinal element (18*a*, 18*b*) is mounted in a rotary manner on the frame 3 in order to be pivoted between the positions P5 and P6. In particular, each element (18*a*, 18*b*) comprises a seat 33 for coupling to the frame 3.

This seat 33 is a circular cavity configured to be coupled to a shaft 34: it should be noted that the seat 33 receives the shaft 34 in its interior such that the element 18*a* is slotted over the shaft 34. The shaft is pivotable with respect to the frame 3, in particular pivotable with respect to a cylinder 41.

The machine 1 furthermore comprises means for fixing each element (18*a*, 18*b*) to the shaft 34. These fixing means comprise a plurality of holes made in the shaft 34 and in the element (18*a*, 18*b*), and a screw or pin configured to pass through said holes and lock the element (18*a*, 18*b*) on the shaft 34. The element (18*a*, 18*b*) is able to move away from the plate in the direction designated D2 in the appended figures.

The machine 1 comprises means 35 for rotating the shaft 34. These means 35, which are clearly visible in FIG. 9, comprise a piston 37 connected to the shaft 34 by way of a crank 36, sliding with respect to a cylinder 38. The cylinder and the piston 37 define a drive for setting the shaft 34 in rotation.

When the shaft 34 is driven in rotation, the element (18*a*, 18*b*) secured thereto is also driven in rotation. Consequently, more generally, the machine 1 comprises means 40 for manipulating the retaining means 18 so as to allow the manipulation of the retaining means 18 between the two positions P5 and P6. These manipulating means 40 comprise the shaft 34 and the means 35 described above.

In the absence of the element 23, the tire 2 is disposed in the loading zone 30 such that one sidewall adjoins the plate 22 and the other sidewall 2*c*, opposite the first, adjoins the longitudinal bars (18*a*, 18*b*) when the latter are disposed in the operating position P5.

Figure 9:
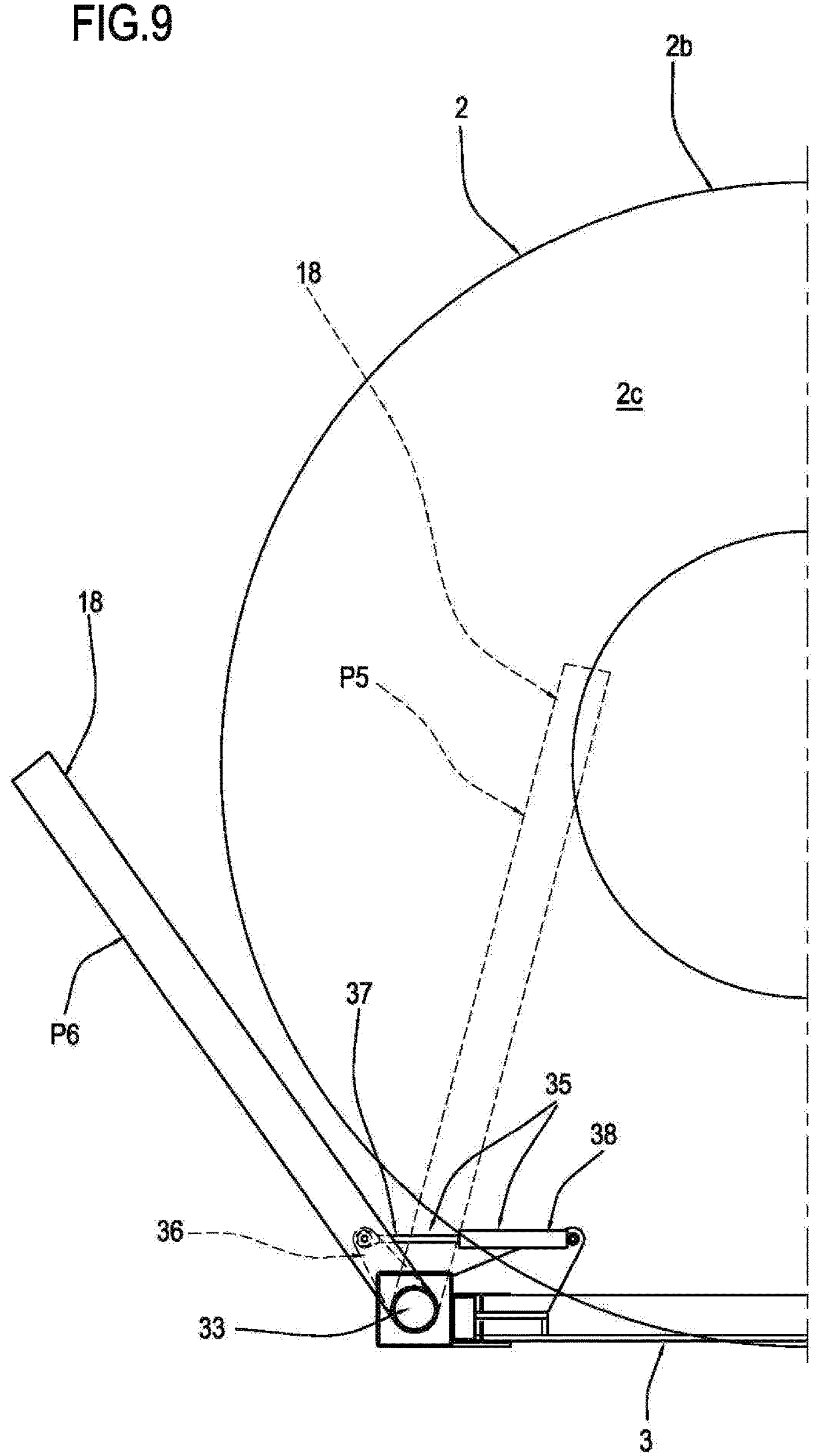
FIG. 9 illustrates a front view of a detail of the machine shown in the preceding figures.
Figure 10:
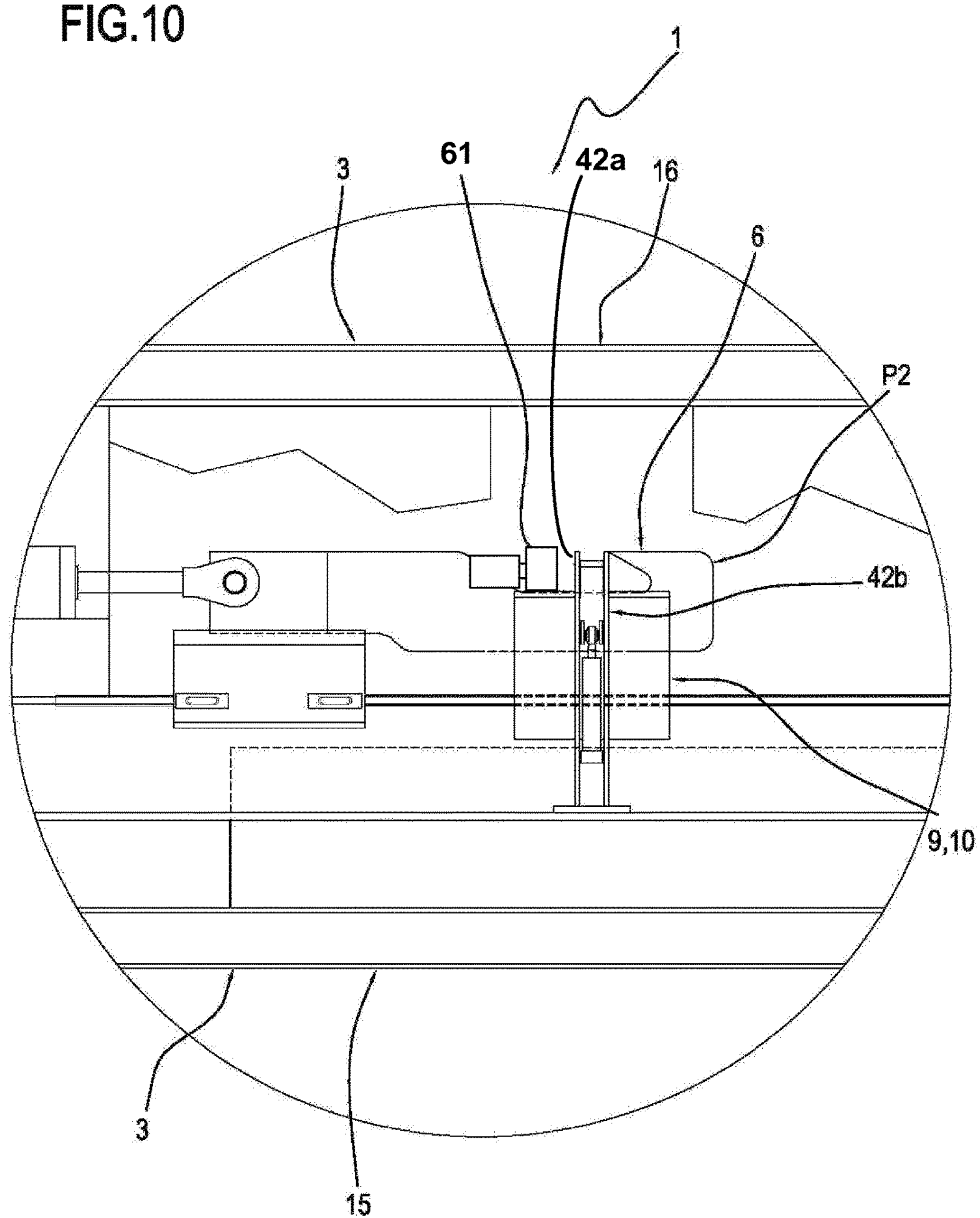
FIG. 10 illustrates a detail of the machine shown in the preceding figures.

As is apparent from FIG. 9, the longitudinal bars (18*a*, 18*b*) are disposed in the position P6 during the operations of loading/unloading the tire. In this way, the loading zone 30 for the tire opposite the plate 22 is freely accessible to the means for loading and handling the tire 2.

According to the invention, the machine 1 comprises a hook 6 for extracting the steel cord 32 from the sidewall 2*a* of the tire 2, and means 7 for manipulating the hook 6.

The means 7 for manipulating the hook 6 are configured to allow the hook 6 to move with respect to the frame 3 in an extraction direction D1 between two end positions: a position P1 for engagement with said tire 2 and a position P2 for disengagement from said tire 2 and extraction of said cord 32 from the sidewall 2*a*. These means 7 for manipulating the hook comprise a slide 7*a* on which the hook 6 slides, and means 44 for driving the hook.

In the embodiment illustrated, the drive means 44 comprise a pair of hydraulic cylinders 45*a* and 45*b* that are connected to the frame 3 and to the hook 6 in order to allow the hook 6 to move with respect to the frame 3.

Figure 2:
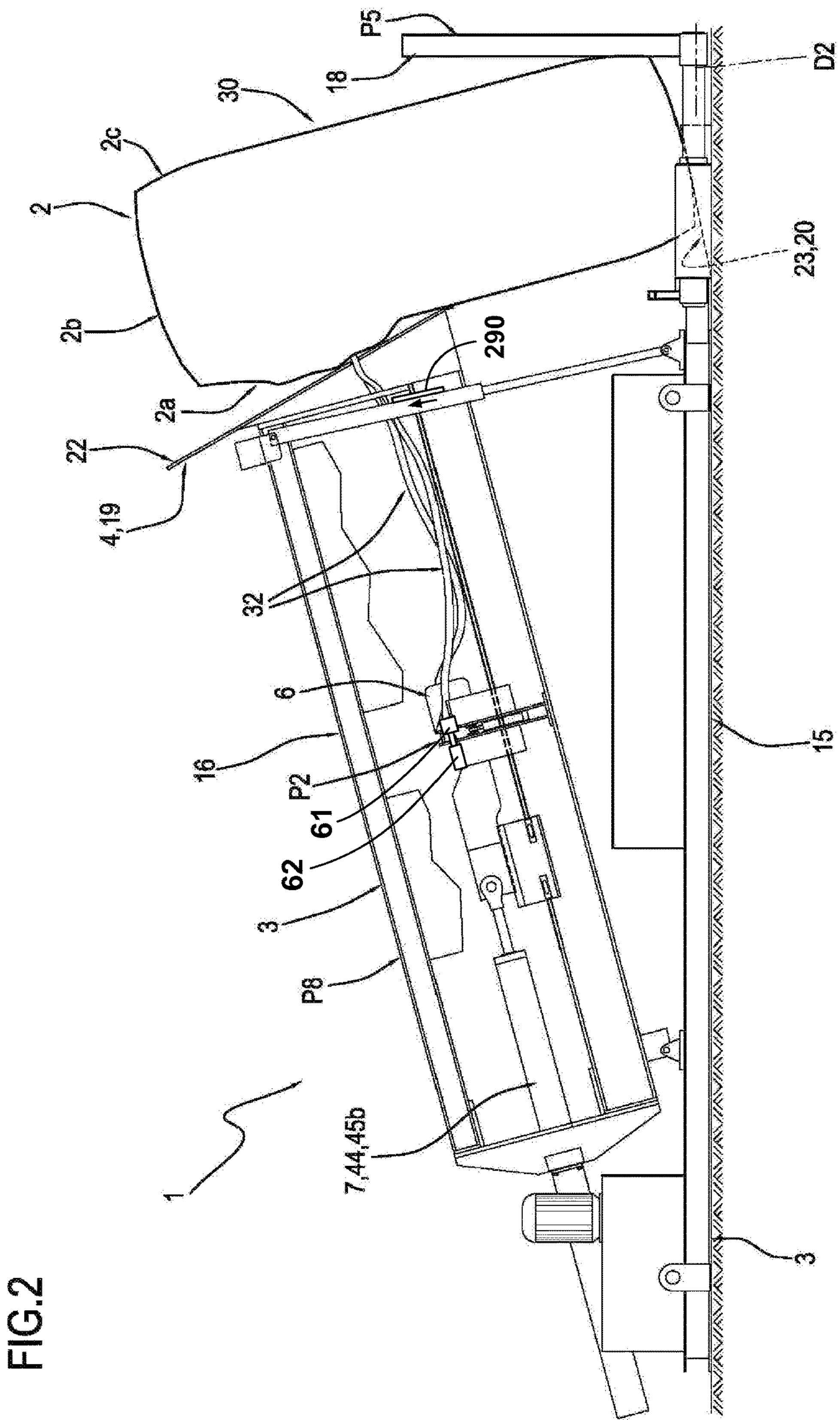

FIG. 1 shows the hook 6 in the position P1 for engagement with a tire 2 while FIG. 2 shows the hook 6 in the position P2 for disengagement and extraction of the cord 32 from the tire 2. In this position P1 for engagement, the hook 6 is in contact with the internal surface of the sidewall 2*a* of the tire 2 (heel of the tire 2) in a zone of the sidewall 2*a* in which the steel cord 32 which has to be extracted, that is to say debeaded, is present.

The hook 6 may comprise a presser 61 actuated by a hydraulic cylinder 62 that is able to immobilize the steel cord 32 against the internal part of the hook and prevent any sliding movements by the bead wire 32 once the latter has been grasped by said hook.

According to the invention, the machine 1 also comprises a controller for the control and drive unit 8, configured to control said means 7 for manipulating the hook 6.

The control unit 8 is provided with controllers that can be actuated by a user in order to control the movement of the hook 6 (and to carry out other operations on the machine 1, as will be described in more detail below).

The machine 1 also comprises an element 9 that is able to move with respect to the frame 3 between a rest position P3 and an operating position P4, in order to remove the cord 32 from the hook when the hook 6 is in said position P2 for disengagement and extraction and the cord 32 is hooked on the hook 6. This movable element 9 is clearly visible in the enlarged views in FIGS. 5 to 7.

According to the preferred embodiment illustrated in the appended figures, the movable element 9 is pivotable in a hinged manner on the frame 3. In particular, the movable element 9 is pivotable in a hinged manner on the frame 3 so as to be able to rotate between a rest position P3 (shown in FIG. 5) and an operational position P4 (shown in FIG. 7). The movable element 9 is pivotable in a hinged manner on the frame 3 at a point designated 42 and is hinged at a pair of yoked elements 42*a* and 42*b*. Preferably, the movable element 9 comprises a plate 10.

The machine 1 comprises means 11 for manipulating the movable element 9. According to the preferred embodiment of the machine 1, the means 11 for manipulating the movable element 9 comprise a drive 12 directly connected to the movable element 9.

Preferably, the drive 12 is a drive of the hydraulic type. Preferably, the drive 12 comprises a piston 13 that is associated in a sliding manner with a cylinder 14 and said piston 13 or said cylinder 14 is connected to said movable element 9 and the other of these two components is connected to the frame 3.

Preferably, the movable element 9 is able to move in a plane substantially at right angles to the extraction direction D1. In other words, each point of the element 9 is able to move in a plane at right angles to the extraction direction D1.

According to another aspect, the machine 1 comprises a step 21, fixed to said frame 3 in order to be occupied by the operator and disposed substantially at said movable element 9. Still according to this aspect, the machine 1 comprises means for detecting the presence of the operator on said step 21, said means being connected to the control unit 8. The control unit 8 is preferably configured to deactivate the movement of the hook 6 if the presence of the operator on said step 21 is detected.

It should be noted that if the cord 32 were to remain hooked on the hook 6 in spite of the intervention of the element 9, the operator can advantageously climb onto said step 21 in order to manually remove the cord 32. During this manual removal operation, the movement of the hook 6 is deactivated so as to eliminate any risk to the safety of the operator.

Preferably, the frame 3 comprises a first part 15, provided with means 17 for resting on the ground, and a second part 16 linked to the first part 15 in a movable manner.

As can be clearly seen from the appended figures, the second part 16 is disposed above the first part 15.

In the example that serves to support the present description, the second part 16 is pivotable in a hinged manner on the first part 15. In particular, the centre of rotation of the second part 16 with respect to the first part 15 has been designated by the reference numeral 24 and the rotation axis by X.

More generally, the second part 16 is able to move with respect to the first part 15 between a close-up first end position P7 and a distanced second end position P8.

The second part 16 can be disposed in any intermediate position between the abovementioned end positions P7 and P8. The second part 16 of the frame 3 carries the plate 22, the movable element and the hook 6. In the example illustrated, and with reference to the case in which the second part 16 is pivotable in a hinged manner on the first part 15, it can be seen that in the close-up first position P7, the second part 16 is substantially horizontal. In this close-up first position P7, the direction D1 of movement of the hook is substantially horizontal. The second part 16 is disposed in the second end position P8 in order to debead tires 2 having a particularly large radius.

The hook 6 is carried by the second part 16, and the fact that the second part 16 is able to move vertically with respect to the first position 15 makes it possible to dispose the hook 6 at the correct height for the tire during treatment. In other words, this feature of a second part 16 linked in a movable manner to the first part 15 in order to be moved at least vertically allows the machine 1 to be adapted easily to the tire during treatment: specifically, it is possible to position the hook 6 at the correct height depending on the effective dimensions of said tire.

The machine 1 also comprises means 26 for the relative movement of the second part 16 with respect to the first part 15.

In the example shown, these means 26 for relative movement comprise an actuator 5 linked to the first part 15 and to the second part 16. This actuator 5 is preferably a hydraulic cylinder. According to this embodiment, the actuator 5 comprises a piston 27 associated in a sliding manner with a cylinder 28 and moved by the action of a pressurized fluid. The piston 27 or the cylinder 28 is linked by a hinge to the first part 15 and the other of these two components is linked by a hinge to the second part 16.

In the example illustrated in the figures, the machine 1 comprises a pair of hydraulic actuators.

Figure 8:
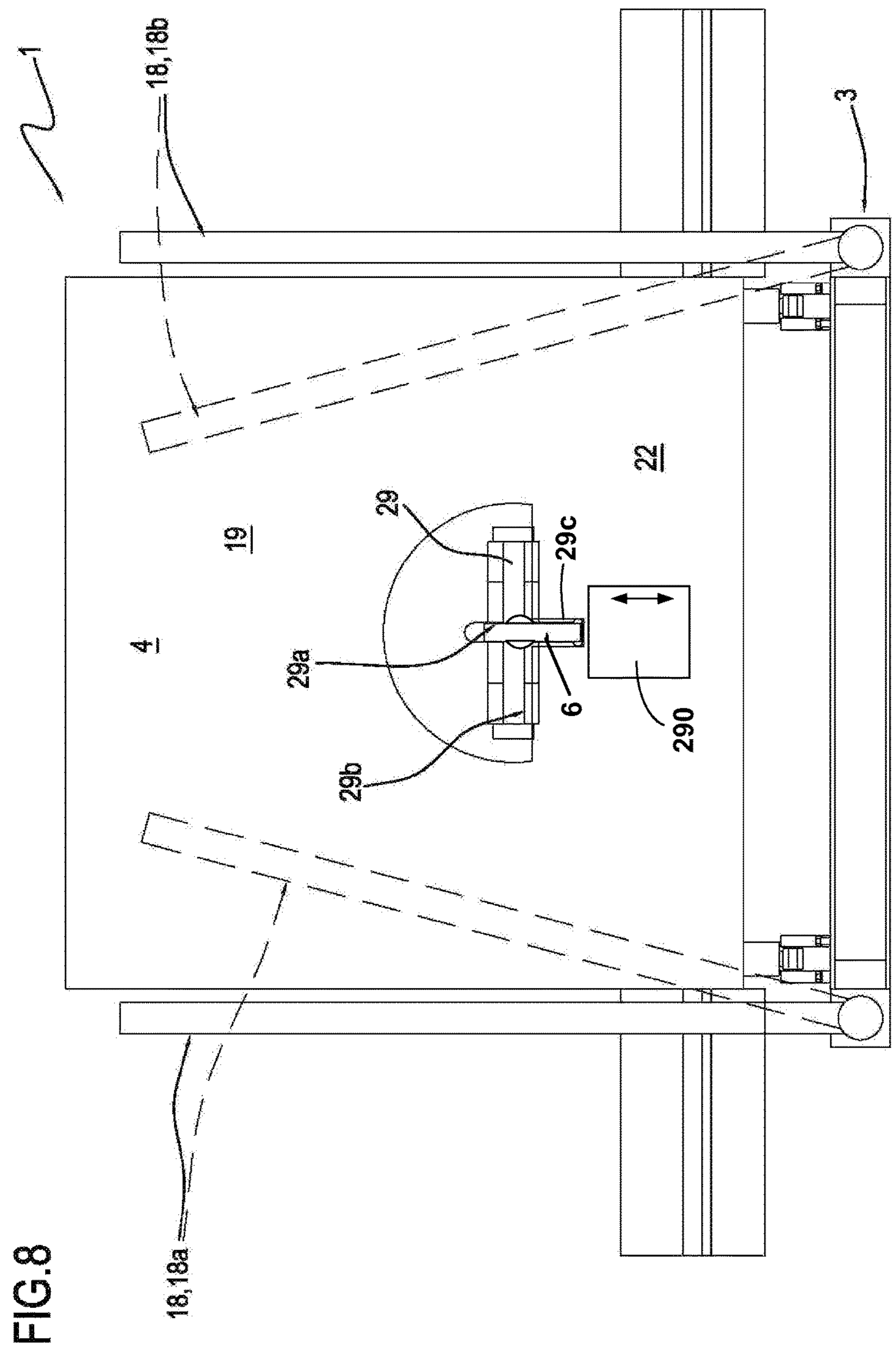
FIG. 8 illustrates a front view of the machine shown in the preceding figures.

Referring to the plate 22, as can be clearly seen in FIG. 8, this plate 22 has an opening 29 through which the hook 6 emerges in order to be disposed in the position P1 for coupling to the sidewall 2*a* of the tire 2.

Preferably, this opening 29 is in the form of a cross and has a vertical part 29*a* and 29*c* and a horizontal part 29*b*. The hook 6 passes through the vertical part 29*a* of the opening 29. This opening 29 is dimensioned such that the cord 32 extracted from the sidewall of the tire 2 can pass through said opening, and in particular passes through the horizontal part 29*b*. The vertical parts 29*a* and 29*c* of the opening 29 allow the hook 6 to travel freely through the opening.

A shutter 290 that is able to move in the vertical direction, as is illustrated in FIG. 8, is disposed on the front face of the plate 22. When it is positioned in its high position, the shutter 290 has the object of closing the passage 29*c*. This contrivance makes it possible to prevent the steel cord from passing through and becoming jammed in this part of the opening. The shutter 290 is positioned in its low position when the hook 6 passes through the plate 22 for the purpose of grasping the bead wire 32.

The debeading of a tire in the machine 1 that is the subject of the invention will be described in the following text.

The machine 1 is capable of allowing a heel reinforcement cord 32 to be removed from a piece of tire 2 consisting solely of a sidewall 2*a* or of an entire tire 2 (assembly of the two sidewalls 2*a*, 2*c* and the cap 2*b*); in the latter case, two operational cycles of the machine 1 would be required, with the tire 2 being repositioned in the loading zone. Specifically, the machine 1 allows the extraction of the cord 32 from the sidewall 2*a* which is resting against the plate 22.

The tire 2 (or the sidewall 2*a*) is loaded, with the aid of handling means of a known type that are not described, in the loading zone 30 of the machine 1, such that the sidewall 2*a*, from which the cord 32 is intended to be removed, rests against the plate 22.

While the tire 2 is loaded in the loading zone, the longitudinal elements 18*a* and 18*b* are disposed in the rest position P6; these elements 18*a* and 18*b* are moved from the position P6 to P5 before the operation of removing the cord 32 from the sidewall of the tire 2 begins.

Before starting the step of removing the steel heel reinforcement cord 32 from the tire 2, it is necessary to position the hook 6 in the correct vertical position with respect to the sidewall 2*a* of the tire 2 during treatment.

To this end, the operator moves the second part 16 of the frame 3 with respect to the first part 15 so as to vertically position the hook 6 in the correct position with respect to the sidewall 2*a* of the tire during treatment.

The vertical movement of the second part 16 with respect to the first part 15 makes it possible to vary the attitude of the tire 2 in the loading zone.

The hook 6 is disposed in the coupling position P1.

In the coupling position, the hook 6 juts out from the opening 29, in particular from the vertical part 29*b*, and is located in the loading zone 30.

Before the operation of removing the cord 32 is started, the hook 6 should be coupled to the internal surface of the sidewall 2*a*, specifically with the surface of the sidewall 2*a* opposite that resting against the plate 22. The presser 61 is brought into abutment against the steel cord.

The operation of extracting the cord 32 from the sidewall 2*a* of the tire 2 provides for the hook 6 to be manipulated from the position P1 for engagement to that P2 for disengagement and extraction, in the extraction direction D1. Such manipulation can provide for a number of movement cycles in the abovementioned direction D1 to be carried out between the two positions P1 and P2, namely a combination of movements for moving towards and away from the position P1.

When the hook 6 is disposed in the position P2 for disengagement and extraction, as shown in FIG. 2, the cord 32 is extracted, or removed, from the sidewall 2*a*.

Figure 5:
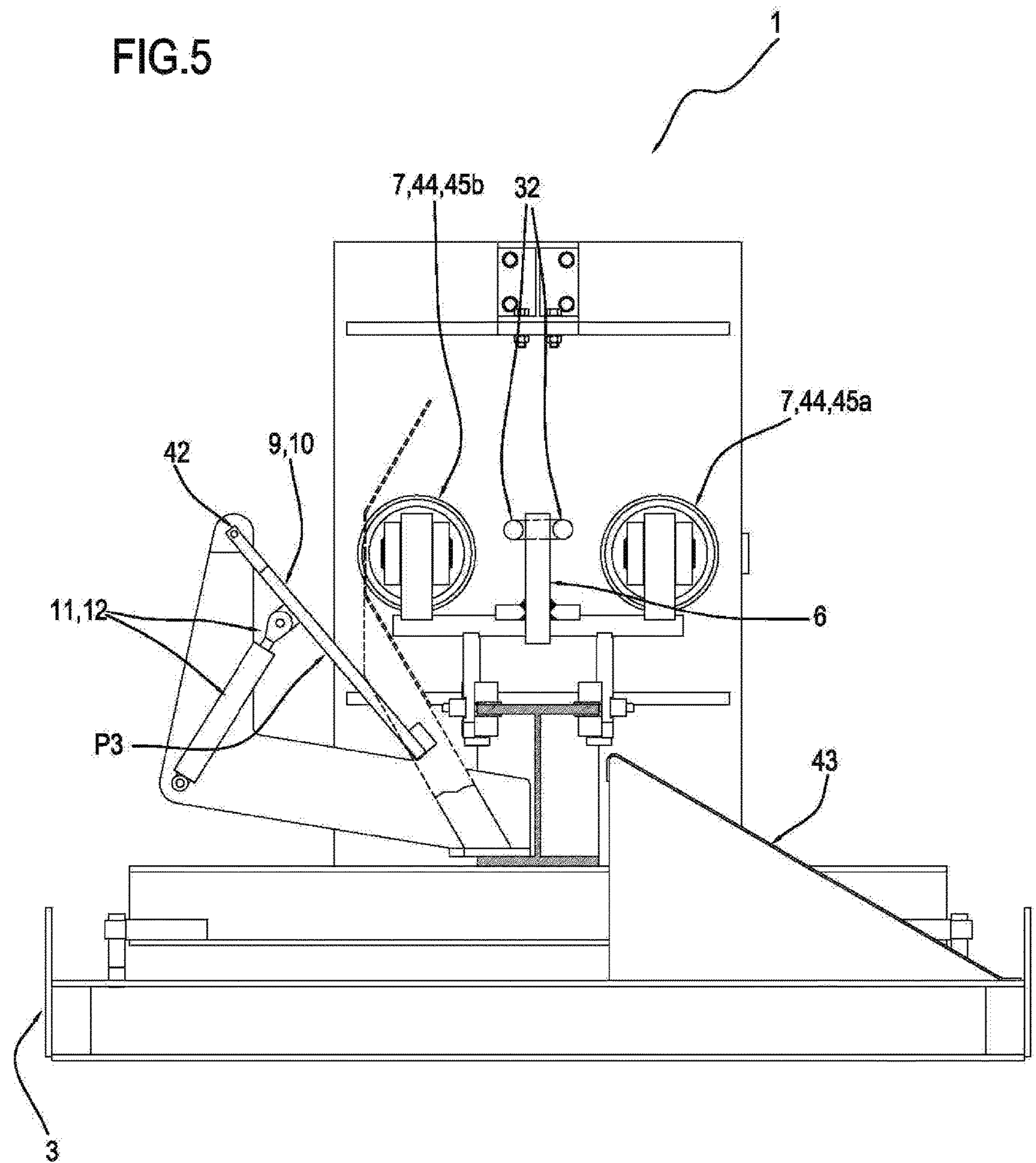
FIGS. 5 to 7 illustrate respective front views of a detail of the machine shown in the preceding figures.
Figure 6:
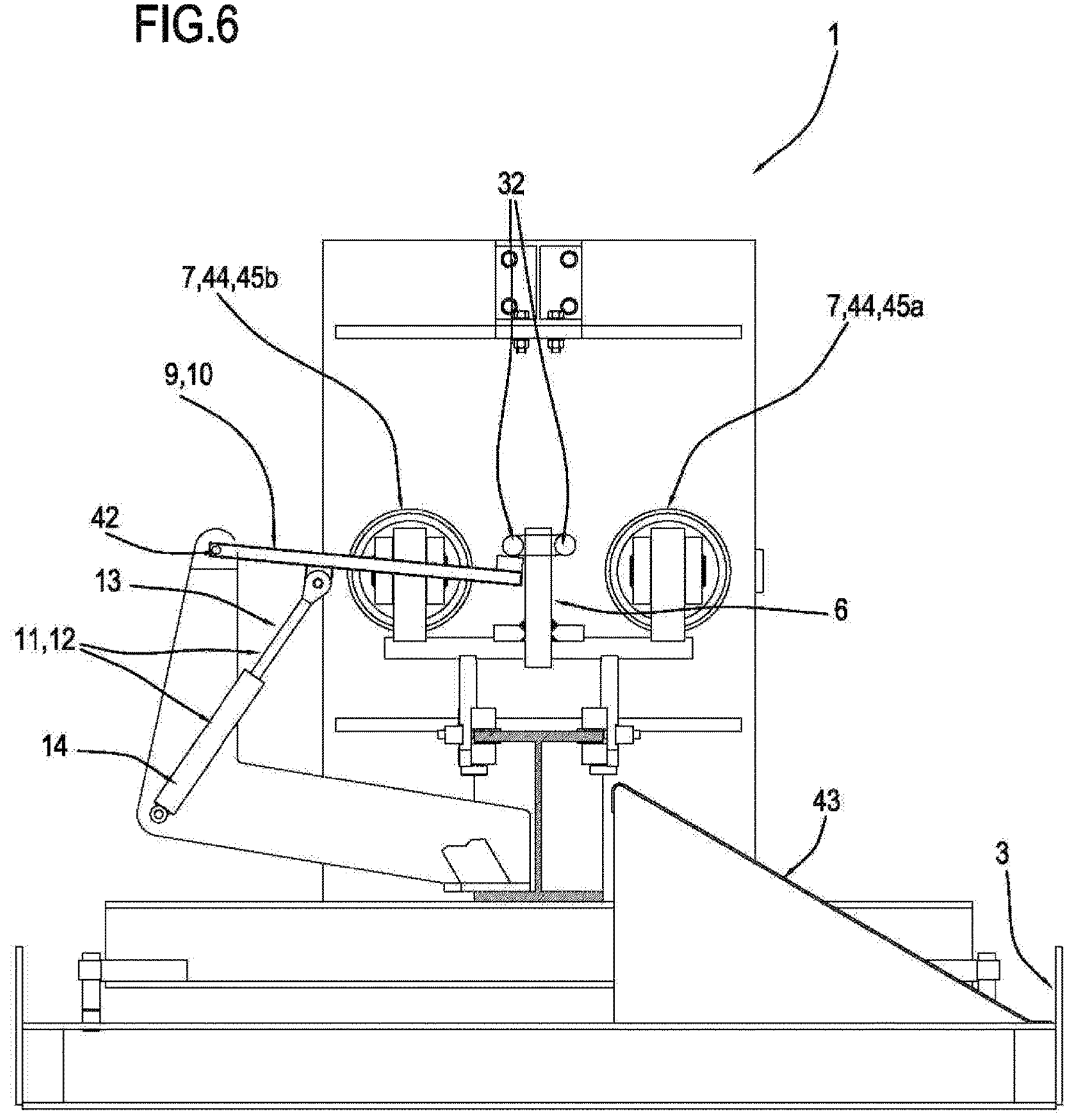
Figure 7:
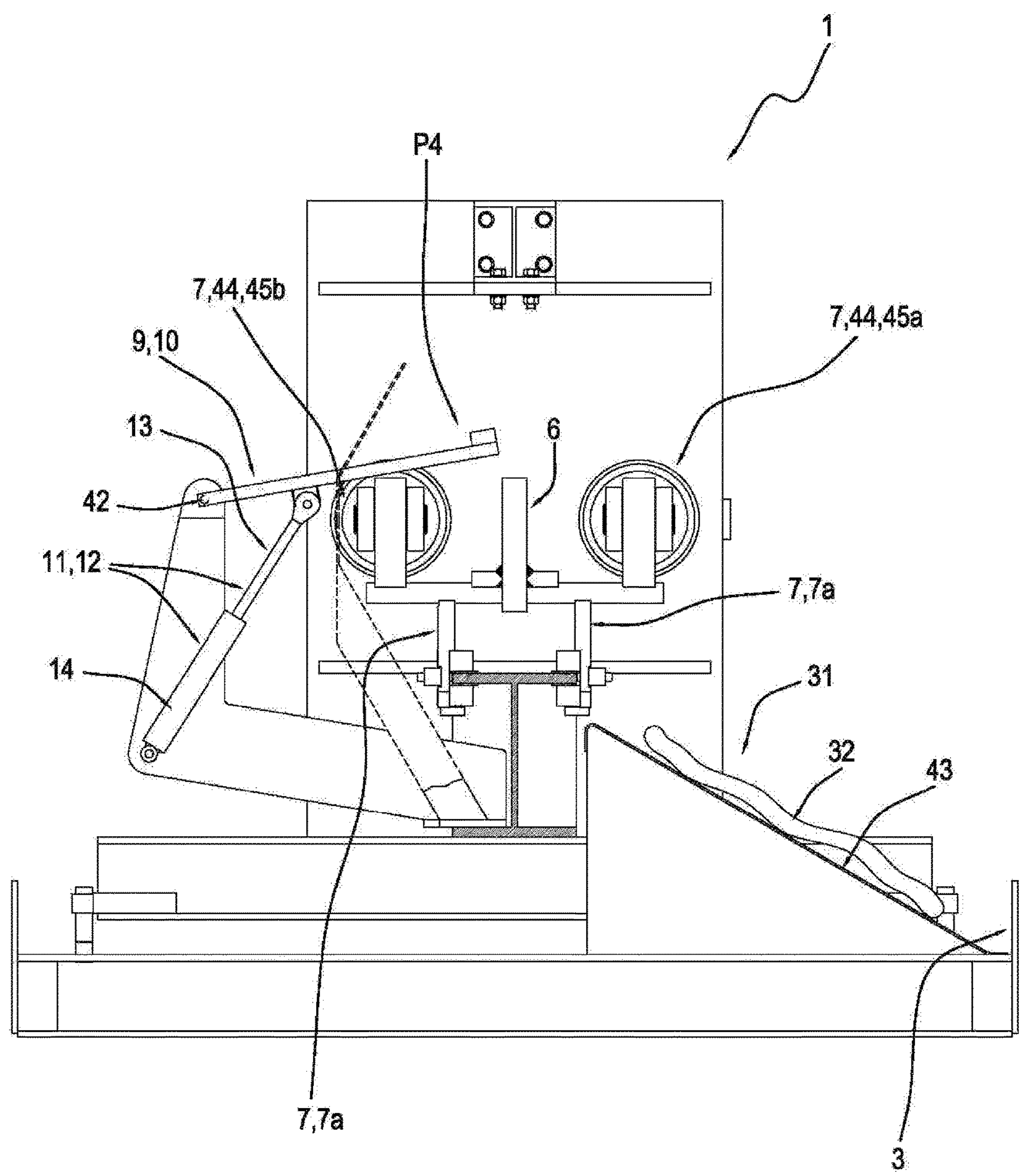

In this state, the cord 32 is connected to the hook 6 and it is necessary to unhook it therefrom. When the cord has been completely removed from the bead, the presser 61 is deactivated and the movable element 9 is thus moved from the first position P3 to the second, operational position P4. FIGS. 5 to 7 illustrate this sequence of operation.

During its movement from the position P3 (FIG. 5) to the position P4 (FIG. 7), the movable element 9 detaches the cord 32 from the hook 6 and causes the cord 32 to drop into a zone 31 of the machine 1 for receiving the cord 32, where a toboggan 43 integrated into the machine 1 is disposed.

FIGS. 11 and 12 and 18*a* to 19*b* illustrate respective views of a first and a second variant of another embodiment of the machine according to the invention. According to this embodiment, the machine 1 comprises a device 47, or 47', respectively, for clamping the sidewall 2*a* against the plate 22.

This clamping device 47, 47' can be employed in the event that the sidewall 2*a*, separated from the cap of the tire, is loaded on the machine 1, so as to advantageously keep the sidewall 2*a* firmly clamped with respect to the frame 3 during the operations of detaching the cord 32 that have already been described above.

This clamping device 47, 47' comprises one or more clamping elements 48 (a single clamping element in the example shown in FIGS. 18*a* to 19*b* and two elements 48*a* and 48*b* in the example illustrated in FIGS. 11 and 12) that are able to move between a releasing position P9 and a clamping position P10 in which they act on the surface of the sidewall 2*a* (on the side away from the plate 22) in order to clamp it against the plate 22 itself. The clamping element(s) 48 are preferably mounted in a pivotable manner on hinges with respect to the frame 3 so as to rotate between said releasing position P9 and clamping position P10.

Figure 11:
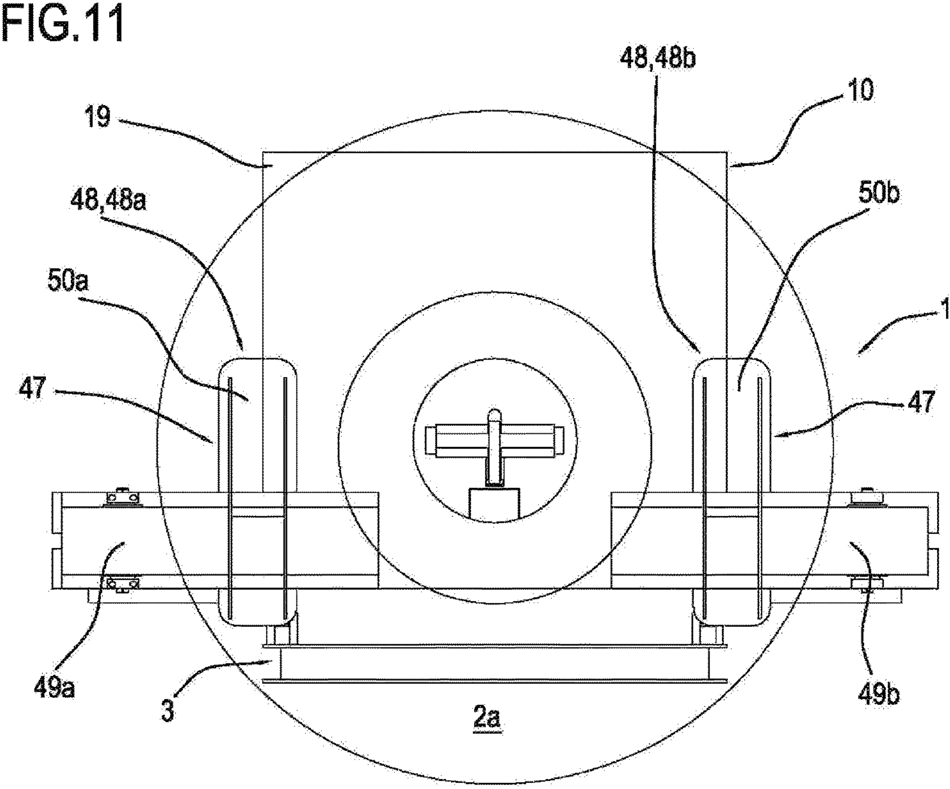
FIGS. 11 and 12 illustrate respective views of another detail of the machine that is the subject of the present invention.
Figure 12:
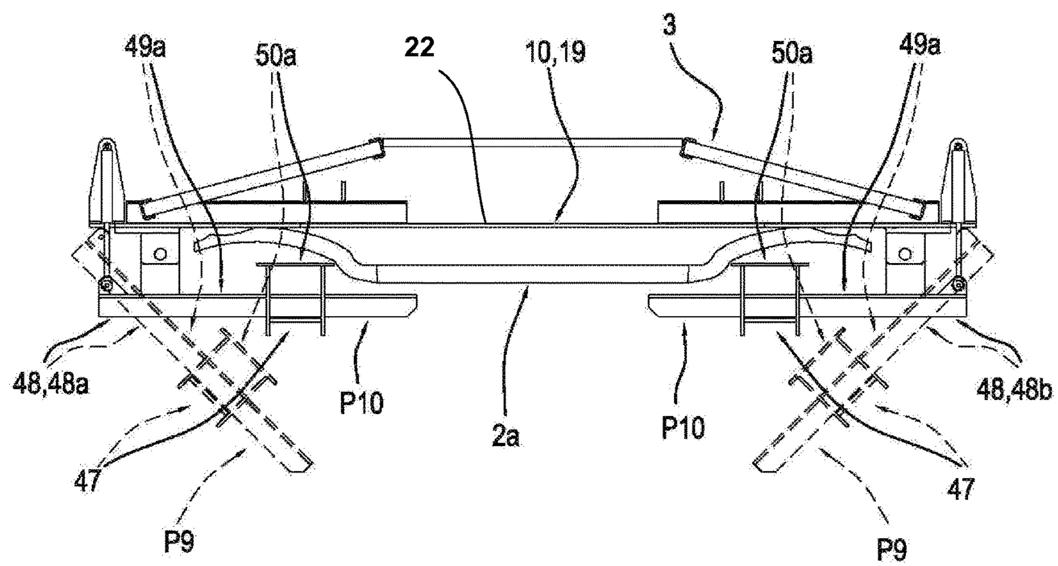

According to the first variant illustrated in FIGS. 11 and 12, each clamping element 48*a*, 48*b* comprises a first element 49*a*, 49*b* and a second element 50*a*, 50*b* that is carried by the first element 49*a*, 49*b* and acts on the surface of the sidewall 2*a* on either side of the central opening in the sidewall 2*a* in order to clamp the latter.

The first element 49*a*, 49*b* is pivotable in a hinged manner, about a substantially vertical axis, with respect to the frame 3, as described above. Furthermore, as is visible in FIG. 12, provision is made of a cylinder for rotating the elements 49*a*, 49*b* about their respective hinge.

Figure 18C:
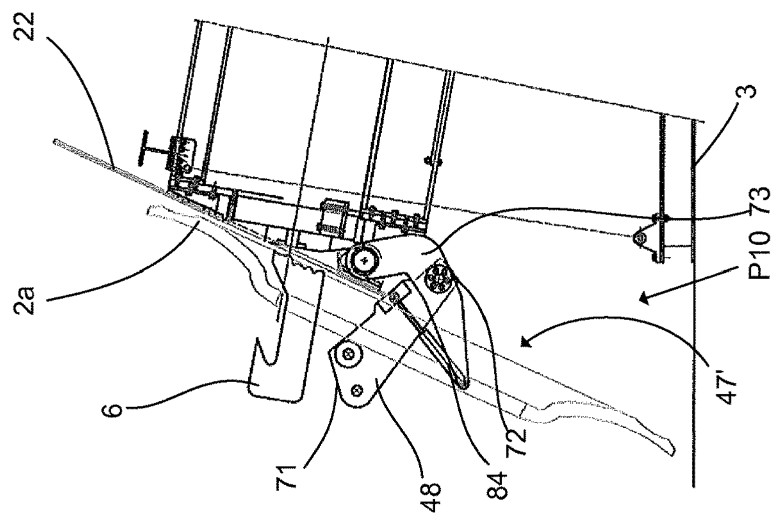
FIGS. 18*a*, 18*b*, and 18*c* illustrate sectional views of different operating positions of a sidewall clamping device according to a variant embodiment of the invention.
Figure 18B:
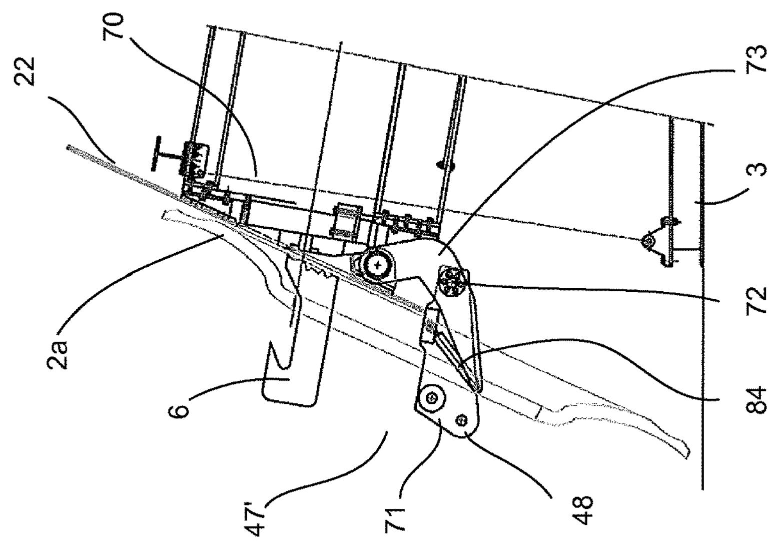
Figure 18A:
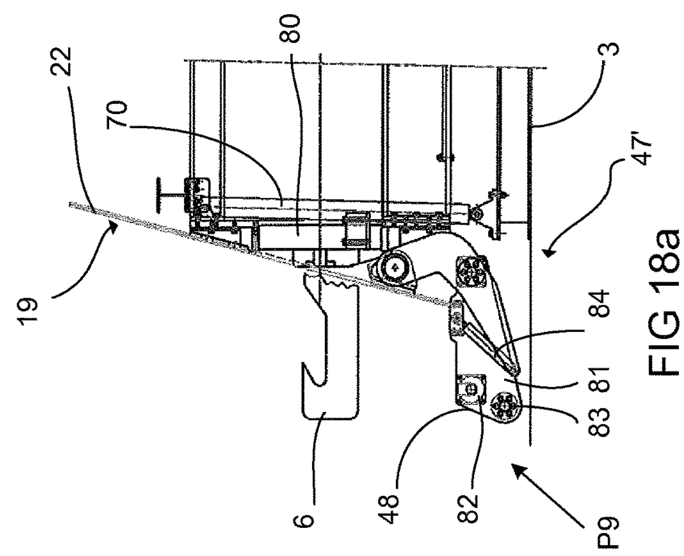

FIGS. 18*a* to 18*c* illustrate sectional views of a device 47' for clamping the sidewall 2*a* against the plate 22 according to a second variant embodiment of the invention. The clamping element 48 comprises a transverse bar for clamping the sidewall 2*a*, having a length greater than that of the plate 22 so as to be able to keep the sidewall clamped across its entire diameter. The clamping bar 48 is able to pivot about a hinge of horizontal axis between said releasing position P9 and clamping position P10.

Figures 19A, 19B:
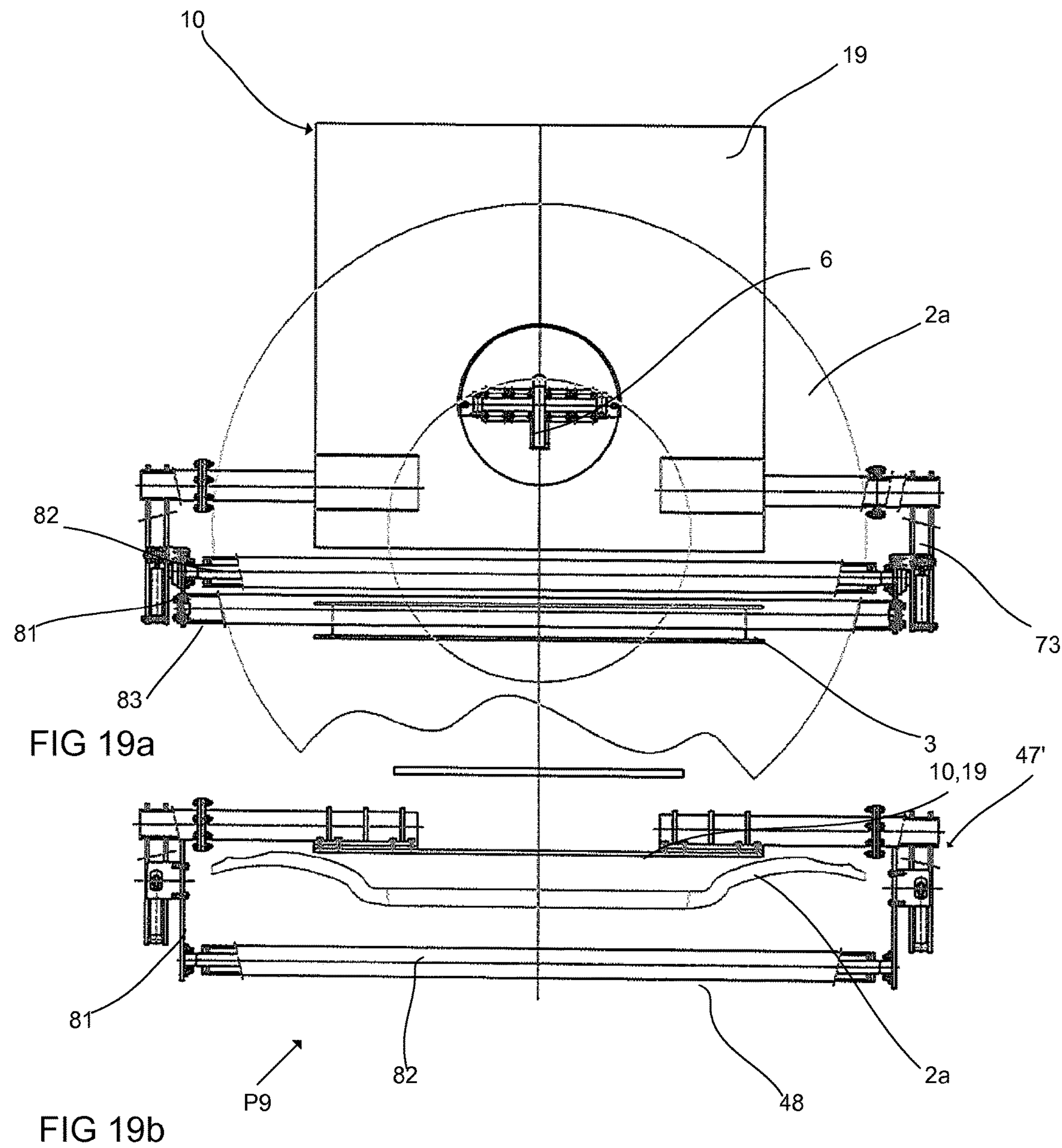
FIGS. 19*a* and 19*b* illustrate a front view and a top view of the clamping device from FIG. 18*a*.

FIG. 18*a* illustrates the device 47' for clamping the sidewall 2*a* and the hook 6 in the rest position. The hook 6 and the clamping device 47' are secured to a carriage 80 and are arranged so as to be able to be driven in vertical movement with respect to the plate 22 by a hydraulic cylinder 70. FIGS. 19*a* and 19*b* illustrate a front view and a top view of the clamping device 47' in its rest position illustrated in FIG. 18*a*. The transverse bar forming the clamping element 48 comprises two parallel flanges 81 that are held together by a horizontal spacer 83 and support a pressing roller 82. The pressing roller 82 is arranged so as to be able to rotate freely about a horizontal axis parallel to that of the spacer 83 so as to minimize the frictional forces with the sidewall 2*a* while the metal cord is being pulled out.

FIG. 18*b* illustrates the clamping device 47' and the hook 6 in the loading position (the device 47' being in its releasing position P9), when they are raised with respect to the ground (or to the base of the frame 3) in order to be able to receive a pre-cut sidewall 2*a*. The loading position is chosen so that the hook 6 is arranged at the height of the upper part of a sidewall 2*a* which is thus suspended from the hook 6 such that it engages with the heel reinforcement cord. In other words, in this position, the central part of the sidewall 2*a* is passed through by the device 47' and the hook 6 is located at the bead wire.

FIG. 18*c* illustrates the clamping device 47' in the working position. In this position, the front part 71 of the clamping element 48 is actuated by a hydraulic cylinder 84 and pivots about a hinge 72 of horizontal axis of a cradle 73 in order to clamp the sidewall 2*a* in a manner resting against the plate 22. When the clamping element 48 thus holds the sidewall 2*a*, the upper end of the front part 71 is located as close as possible to the hook 6 in order to firmly hold the sidewall at the location at which the pulling force is applied. In this position of the clamping device 47', the hook 6 can be actuated in order to carry out debeading.

FIGS. 13 to 17 for their part illustrate a variant of the movable element 9.

Figure 13:
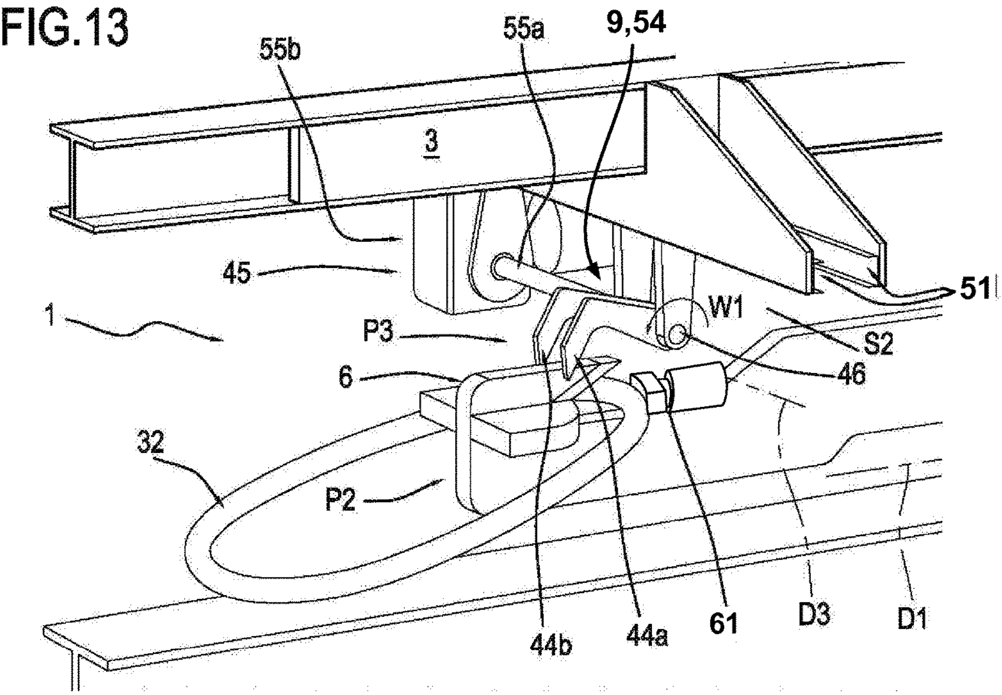
FIGS. 13 to 17 illustrate another detail of another variant of the machine that is the subject of the present invention.

According to this variant, the movable element 9 comprises an additional hook 54. This additional hook 54 is pivotable in a hinged manner (with respect to a fulcrum 46) in order to rotate between two end positions (one shown in FIG. 13 and the other shown in FIG. 15). The additional hook 54 is able to move in a direction D3 perpendicular to the direction D1 of movement of the hook 6. It should be noted that this hook 54 is able to move in this direction D3 between two end positions which are shown in FIG. 13 (first position) and FIG. 16 (second position), respectively.

The machine 1 thus preferably comprises means (not shown) for manipulating the additional hook 54 in the direction D3.

The machine 1 also comprises means 45 for rotating the additional hook 54. Preferably, the means 45 for rotating the additional hook 54 comprise a shaft 55*a* (to which this other hook 54 is connected) and a drive 55*b* (which may be an electric motor or similar device).

Preferably, this other hook 54 is guided in the direction D3 by means of a slideway 51 which extends in this direction D3.

FIGS. 13 to 17 illustrate the sequence of unhooking the cord 32 from the hook 6 by means of the additional hook 54.

In FIG. 13, the additional hook 54 is disposed in the rest position, before it is engaged with the cord 32.

Figure 14:
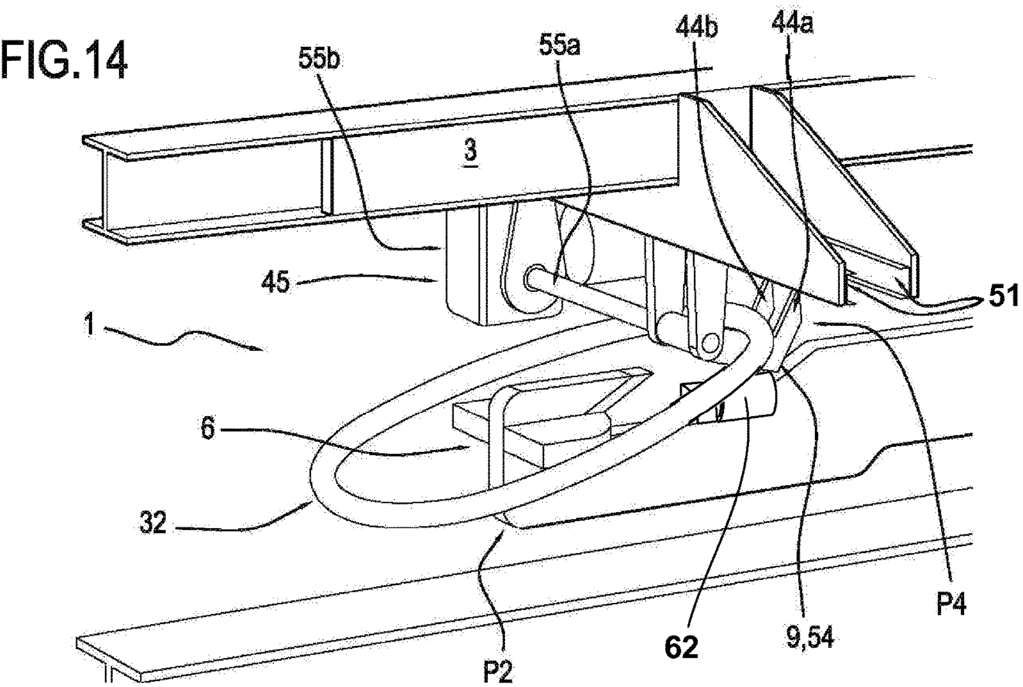

In FIG. 14, the additional hook 54 has already been engaged with the cord 32, detaching it from the hook 6.

The hook 54 is driven in rotation in an extraction direction W1 and, after coming into contact with the cord 32 in the position P3, it lifts it and detaches it from the hook 6.

After the cord 32 has been detached from the hook 6, the additional hook 54 retains the cord 32.

Figure 15:
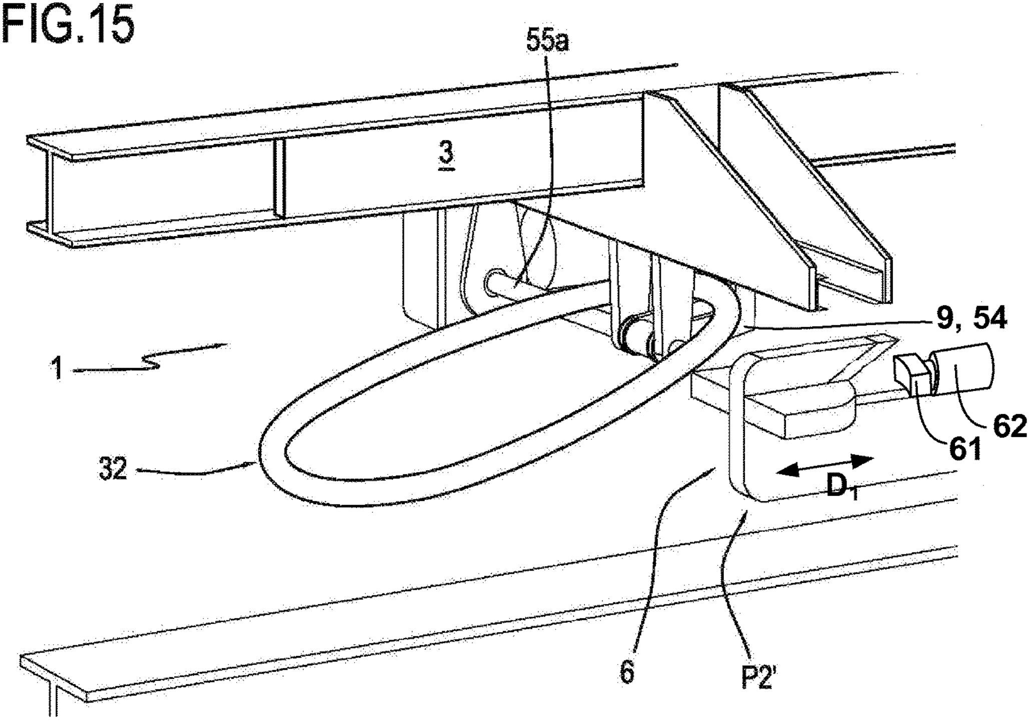
Figure 16:
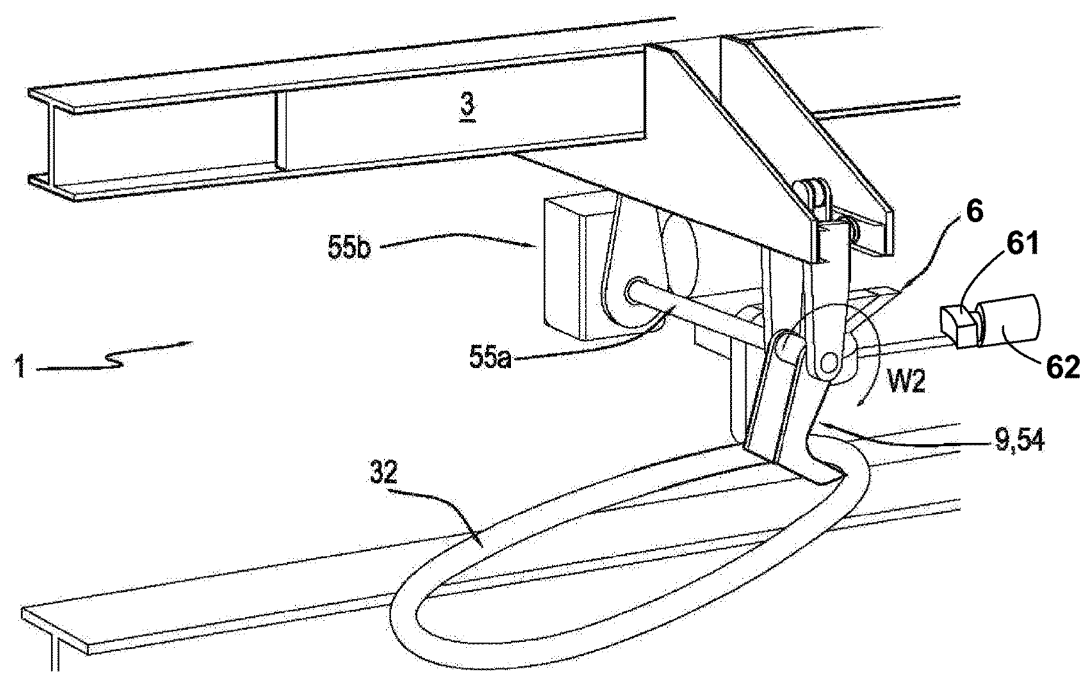

FIG. 15 illustrates a movement of the hook 6 in the direction D1 in order to move this hook 6 out of the overall dimensions of the zone of action of the additional hook 54, until it reaches the position P2'.

Figure 17:
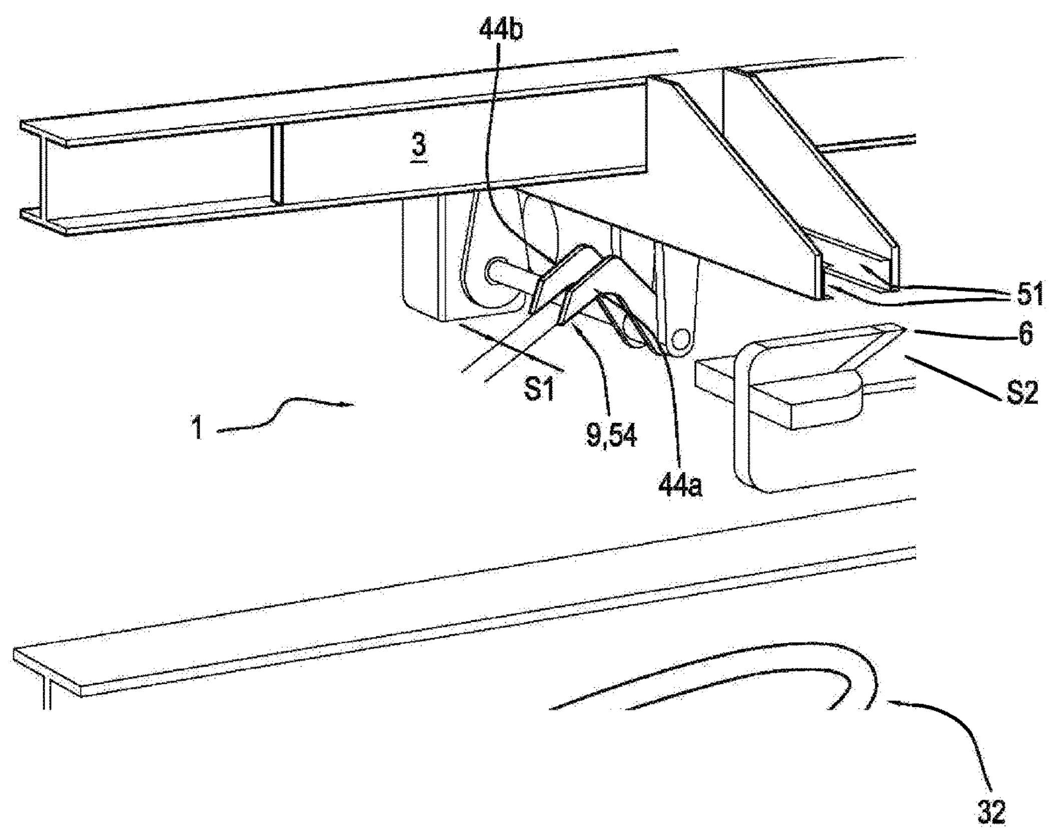

Following this operation, it is then possible to rotate the additional hook 54 in order to release the cord 32. To this end, the hook 54 is turned in the opposite direction W2 to the direction of rotation W1 described above in order to reach the position P4, so as to release the cord 32 (FIG. 17).

Preferably, provision is made to move the additional hook 54 in the direction D3, in order to move it away from the hook 6, so as to release the cord 32 in the pre-established releasing zone.

The additional hook 54 preferably comprises a pair of hooking elements (44*a*, 44*b*). Preferably, these hooking elements (44*a*, 44*b*) are spaced apart from one another in the direction D3 by a distance S1 greater than the thickness S2 of the hook 6 in this direction D3: in this way, during rotation in the direction W1 for hooking the cord 32, these hooking elements (44*a*, 44*b*) are disposed on either side of the hook 6 and do not interfere with the hook 6 during rotation.

One advantage of embodiments of the invention is that it provides a machine 1 for separating the steel heel reinforcement cord 32 from the sidewall of a tire which is very flexible, that is to say is capable of operating with tires of various sizes and is, in particular, capable of carrying out debeading even with heavy duty tires.

Another advantage of the invention is that it provides a machine 1 which is very safe for the end operator: specifically, it should be noted that, in this machine 1, operator interventions are limited simply to controlling the machine 1 and, apart from in exceptional cases, the operator does not have to manipulate the extracted cord 32.

The fact that this machine 1 is particularly safe is of considerable importance, considering that the machine 1 itself is capable of processing particularly bulky tires and, consequently, the risks associated with the dimensions and the forces involved are greater than those in machines of known type.

The present invention, in an embodiment, also defines a method for extracting a cord 32 made of metal material from the sidewall 2*a* of a tire 2, said cord 32 constituting the support structure of said tire 2, said method comprising the steps of:

- disposing said sidewall 2*a* of the tire 2 in a manner resting against support means 4 in a pre-established position;
- prearranging a hook 6 for extracting the cord 32;
- disposing the hook 6 in a position P1 for engagement with the sidewall 2*a* of said tire and gripping the internal surface of said sidewall 2*a;*
- moving the hook 6 in an extraction direction D1, from the position P1 for engagement to a position P2 for disengagement and extraction of the cord 32 from the sidewall 2*a*.

The method also comprises the steps of:

- prearranging a movable element 9 for removing the cord 32 from the hook;
- moving said movable element 9, when the hook 6 is in said position P2 for disengagement and extraction, from a rest position P3 to an operating position P4 in order to come into contact with the cord 32 coupled to said hook 6 and to remove the cord 32 from the hook 6.

Prior to the extraction operation, it is also possible, for some sizes having a small diameter, to sever the cord 32 at a point diametrically opposite the point at which the cord 32 is driven by the hook 6. This then makes it easier for the cord to slide inside the bead and the sidewall during the operation of extracting the steel cord 32. This operation is facilitated by the fact that the cord cannot slide on the hook when the presser 61 is activated.

Another aspect of the implementation of the machine according to an embodiment of the invention has also proved to be very practical. Specifically, for some sizes in which the sidewalls have sufficient rigidity, it is possible to extract each of the bead wires or cords 32 without it being necessary to turn the tire round following the extraction of the first bead wire. Thus, following extraction of the first bead wire 32 located on the side of the sidewall 2*a*, the hook 6 is repositioned in the position P1 for engagement with the sidewall 2*c* in order to grip the external surface of said sidewall 2*c*, so as to extract the second bead wire 32 located on the side of the sidewall 2*c*, leaving the sidewall 2*a* resting against the means 4, and thus without resting the sidewall 2*c* against said means 4.

The operations of extracting the cord can thus take place in an identical manner to those described for extracting the cord 32 located on the side of the sidewall 2*a*.

The invention claimed is:

1. A machine for extracting a cord made of a metal material from a first sidewall of a tire, said cord being part of the first sidewall and defining a support structure of said tire, said machine comprising:

- a frame;
- a tire support which is configured to support said tire while said tire rests on the first sidewall in a loading zone of said machine;
- a hook for extracting said cord from the first sidewall of the tire;
- a hook actuator configured to move said hook in an extraction direction from an engaged position for engagement with said tire, in the loading zone, to a disengaged position to extract said cord from said first sidewall of said tire;
- a cord detachment element that is able to rotate in a direction of rotation with respect to the frame in order to detach the cord from the hook when the hook is in said disengaged position; and
- a cord detachment actuator configured to rotate the cord detachment element from a first position to a second position in order to carry out said detachment of the cord from the hook.

2. The machine according to claim 1, wherein said cord detachment element is pivotable in a hinged manner on the frame.

3. The machine according to claim 1, wherein said cord detachment element comprises a plate.

4. The machine according to claim 1, wherein the hook comprises a presser adapted to clamp the cord against the bottom of said hook.

5. The machine according to claim 1, wherein said movable element comprises another, additional hook.

6. The machine according to claim 5, wherein said additional hook comprises a pair of hooking elements that are disposed with respect to one another in order to act laterally on the cord on either side of said hook.

7. The machine according to claim 1, wherein the cord detachment actuator comprises a piston that is associated in a sliding manner with a cylinder, said piston or said cylinder being connected to said cord detachment element and the other of these two members being connected to the frame.

8. The machine according to claim 1, wherein said frame comprises a first part and a second part, connected in a movable manner to the first part in order to be manipulated at least vertically, said hook being carried by the second part.

9. The machine according to claim 1, further comprising a tire holding means for keeping the tire in the pre-established position, said tire holding means being able to move between a first, operational position in which said tire holding means cooperates with said tire support for holding said tire in a pre-established position, and a second, rest position in which said tire holding means does not act on said tire.

10. The machine according to claim 1, wherein said tire support has a first supporting surface for the first sidewall of the tire and a second supporting surface for the cap of the tire.

11. The machine according to claim 10, wherein the first supporting surface is carried by a plate comprising an opening for the hook and the steel cord to pass through during the extraction of said cord, said opening comprising an upper vertical part and a lower vertical part and a horizontal part, further comprising a shutter that is able to move vertically and is intended to shut off the lower vertical opening.

12. A method for extracting an cord made of metal material from a first sidewall of a tire, said cord defining the support structure of the tire, comprising the steps of:

disposing said first sidewall of the tire in a manner resting against a tire support in a pre-established position;

prearranging a hook for extracting the cord;

disposing the hook in an engagement position for engagement with the first sidewall of said tire and gripping the internal surface of said first sidewall;

moving the hook in an extraction direction from the engagement position to a disengagement position to extract the cord from the first sidewall, prearranging a movable element for removing the cord from the hook;

rotating said movable element, when the hook is in said position for disengagement and extraction, from a rest position to an operating position in order to come into contact with the cord coupled to said hook and to remove the cord from the hook.

13. The method according to claim 12, wherein, once the cord located on the side of the first sidewall has been extracted, the first sidewall of the tire is left resting against the tire support.

14. The method according to claim 12, wherein said movable element includes an additional hook and wherein said step of moving said movable element comprises a step of hooking the cord by means of said additional hook and a successive step of releasing the cord from the additional hook.

15. The method according to claim 12 wherein, during the step of disposing said first sidewall of the tire in a manner resting against the tire support in a pre-established position, provision is made to dispose on the tire support a tire part consisting only of the first sidewall of the tire.

16. The method according to claim 15, wherein, during the step of disposing said first sidewall of said tire in a manner resting against the tire support means, provision is made to clamp said first sidewall of the tire with respect to said frame.

17. The method according to claim 12, wherein, prior to extraction, the cord is severed at a point diametrically opposite the point at which the cord is driven by the hook.

18. A machine for extracting an cord made of metal material from a first sidewall of a tire, said cord being part of the first sidewall and defining a support structure of said tire, said machine comprising:

a frame;

a tire support for the first sidewall;

a hook for extracting said cord from the first sidewall of the tire;

a hook actuator for manipulating said hook, said hook actuator being configured to manipulate the hook with respect to the frame in an extraction direction between an engagement position for engagement with said first sidewall and a disengagement position for disengagement from said first sidewall to extract said cord from the first sidewall;

a clamping device for clamping the first sidewall against a supporting plate of said tire support and wherein said clamping device includes one or more clamping elements that are able to move between a releasing position and a clamping position in which the one or more clamping elements act on the surface of said first sidewall in order to clamp it against the plate; and a cord detachment element and a cord detachment actuator configured to rotate the cord detachment element in a direction of rotation from a first position to a second position in order to detach the cord from the hook when the hook is in said disengagement position.

19. The machine according to claim 18, wherein said clamping elements are mounted in a pivotable manner on hinges with respect to the frame so as to rotate between said releasing position and clamping position.

20. The machine according to claim 18, wherein each clamping element includes a transverse bar that has a length which is greater than that of the supporting plate.

21. The machine according to claim 20, wherein said transverse bar comprises a pressing roller that is mounted so as to be free to rotate.

22. A method for extracting an cord made of metal material from a first sidewall of a tire, said cord defining the support structure of the tire, comprising:

separating said first sidewall from the cap of the tire;

disposing said first sidewall of the tire in a manner resting against a tire support in a pre-established position;

prearranging a hook for extracting the cord;

disposing the hook in an engagement position for engagement with the first sidewall of said tire and gripping the internal surface of said first sidewall;

moving the hook in an extraction direction from the engagement position to a disengagement position for disengagement and extracting the cord from the first sidewall, clamping the first sidewall against a supporting plate of said tire support prior to the hook being moved from the engagement position to the disengagement position;

releasing the first sidewall following extraction of the cord by the hook; and actuating a cord detachment actuator to rotate a cord detachment element in a direction of rotation from a first position to a second position to detach the cord from the hook when the hook is in the disengagement position.

* * * * *